Dec. 31, 1935.  T. ERICKSON  2,026,276
SPRING ASSEMBLING MACHINE
Filed Sept. 30, 1933   5 Sheets-Sheet 2

Inventor:
Theodore Erickson
By Gillson, Mann & Gttys.

Dec. 31, 1935.  T. ERICKSON  2,026,276

SPRING ASSEMBLING MACHINE

Filed Sept. 30, 1933  5 Sheets-Sheet 3

Inventor:
Theodore Erickson
By Gilson, Mann & Co.
Attys

Dec. 31, 1935. T. ERICKSON 2,026,276
SPRING ASSEMBLING MACHINE
Filed Sept. 30, 1933 5 Sheets-Sheet 4
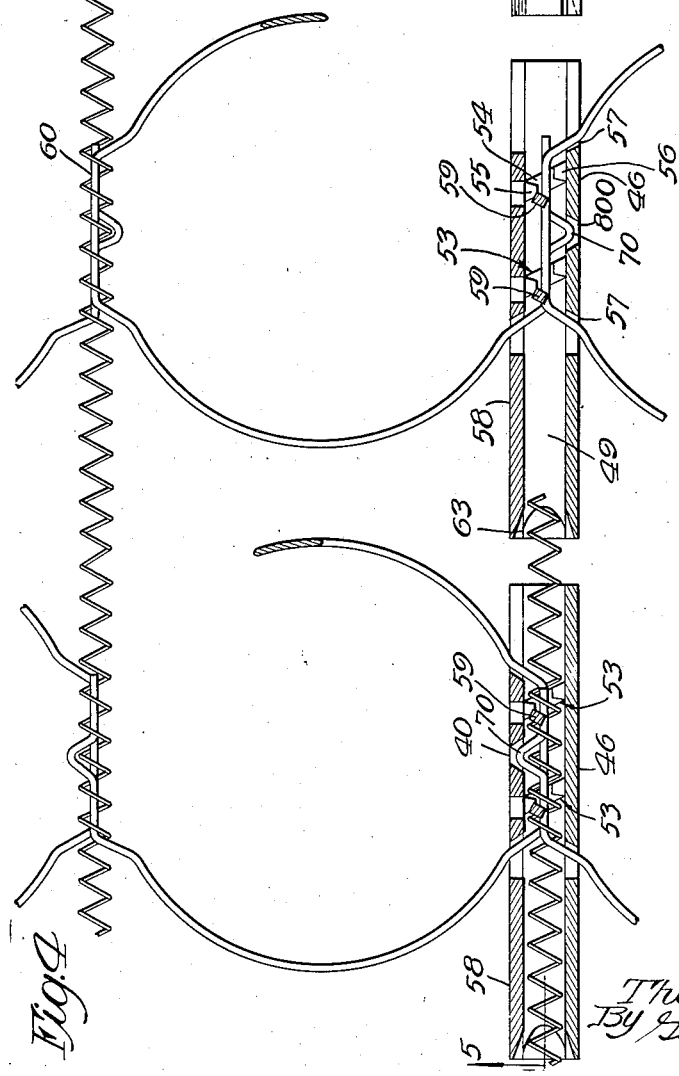
Inventor:
Theodore Erickson Dec. 31, 1935.　　　T. ERICKSON　　　2,026,276
SPRING ASSEMBLING MACHINE
Filed Sept. 30, 1933　　5 Sheets-Sheet 5
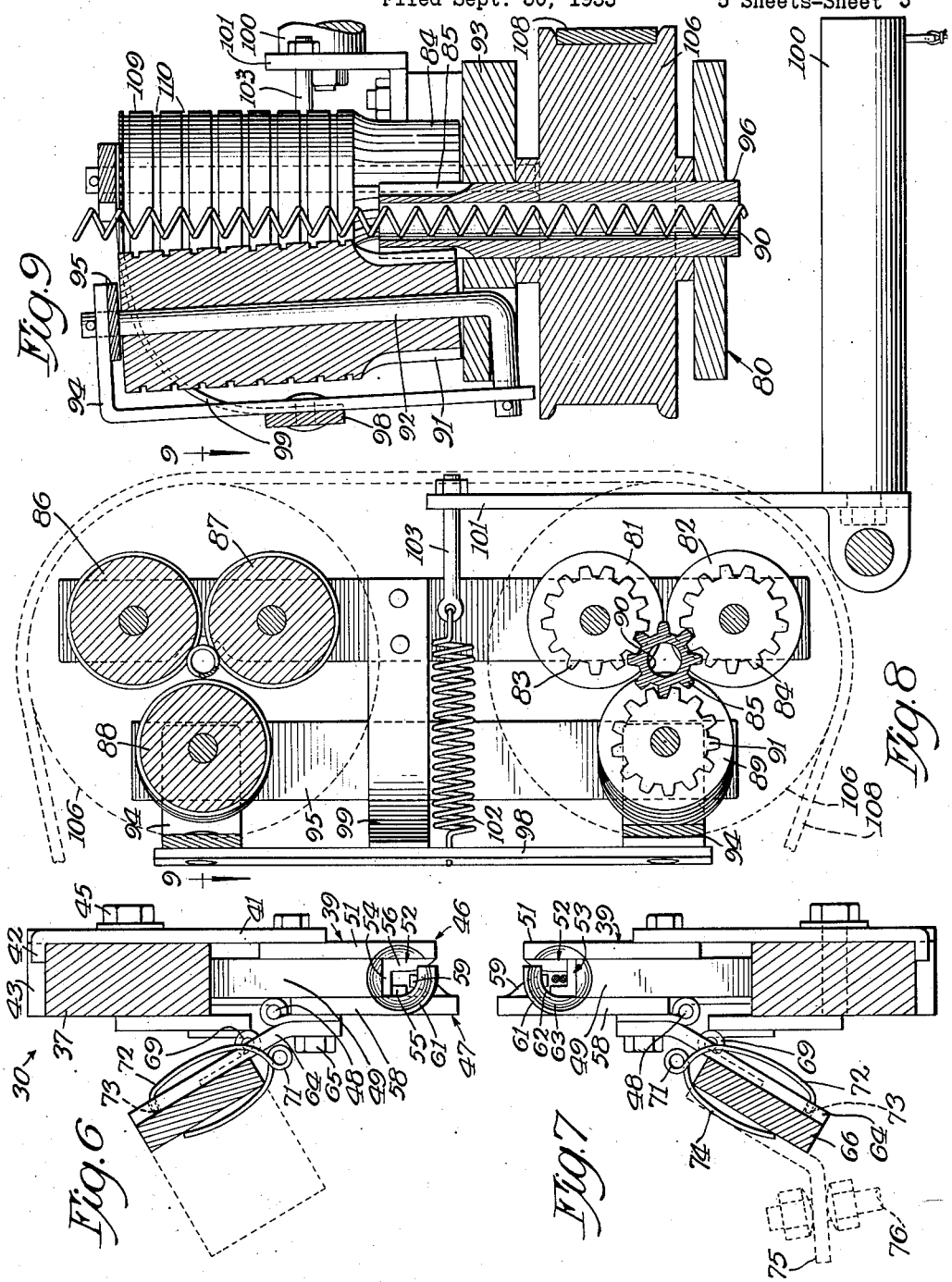
Inventor:
Theodore Erickson
By Gillson, Mann & Co.
Attys.

Patented Dec. 31, 1935

2,026,276

UNITED STATES PATENT OFFICE 2,026,276

SPRING ASSEMBLING MACHINE

Theodore Erickson, Holland, Mich., assignor to Charles Karr Company, a corporation of Michigan Application September 30, 1933, Serial No. 691,620

16 Claims. (Cl. 140—3)

This invention relates to assembling machines, and, more particularly, to machines for connecting rows of spiral springs by helicals to form spring constructions for use in mattresses, cushions and the like.

One of the objects of the invention is the provision of new and improved assembling machine having novel means for assembling spiral springs of different types, diameters and distances apart by connecting them with helicals.

A further object of the invention is the provision of a new and improved jig for use in holding spiral springs in position and for guiding connecting helicals in the manufacture of spring assemblies.

A further object of the invention is the provision of a new and improved spring assembling machine that is simple in construction, efficient in operation, comparatively inexpensive to manufacture and which is not likely to become broken or get out-of-repair.

Other and further objects and advantages of the invention will appear from the following description, taken in connection with the accompanying drawings, in which—

Fig. 4 is a plan view of a side of holding jigs with parts in section, showing the terminal portions of the spirals in position therein;

Fig. 5 is a section on the line 5—5 of Fig. 4 with parts broken away;

Fig. 6 is a section on the line 6—6 of Fig. 2;

Fig. 7 is a section on the line 7—7 of Fig. 2;

Fig. 8 is a section on the line 8—8 of Fig. 2; and

Fig. 9 is a section on the line 9—9 of Fig. 8.

Figure 1:
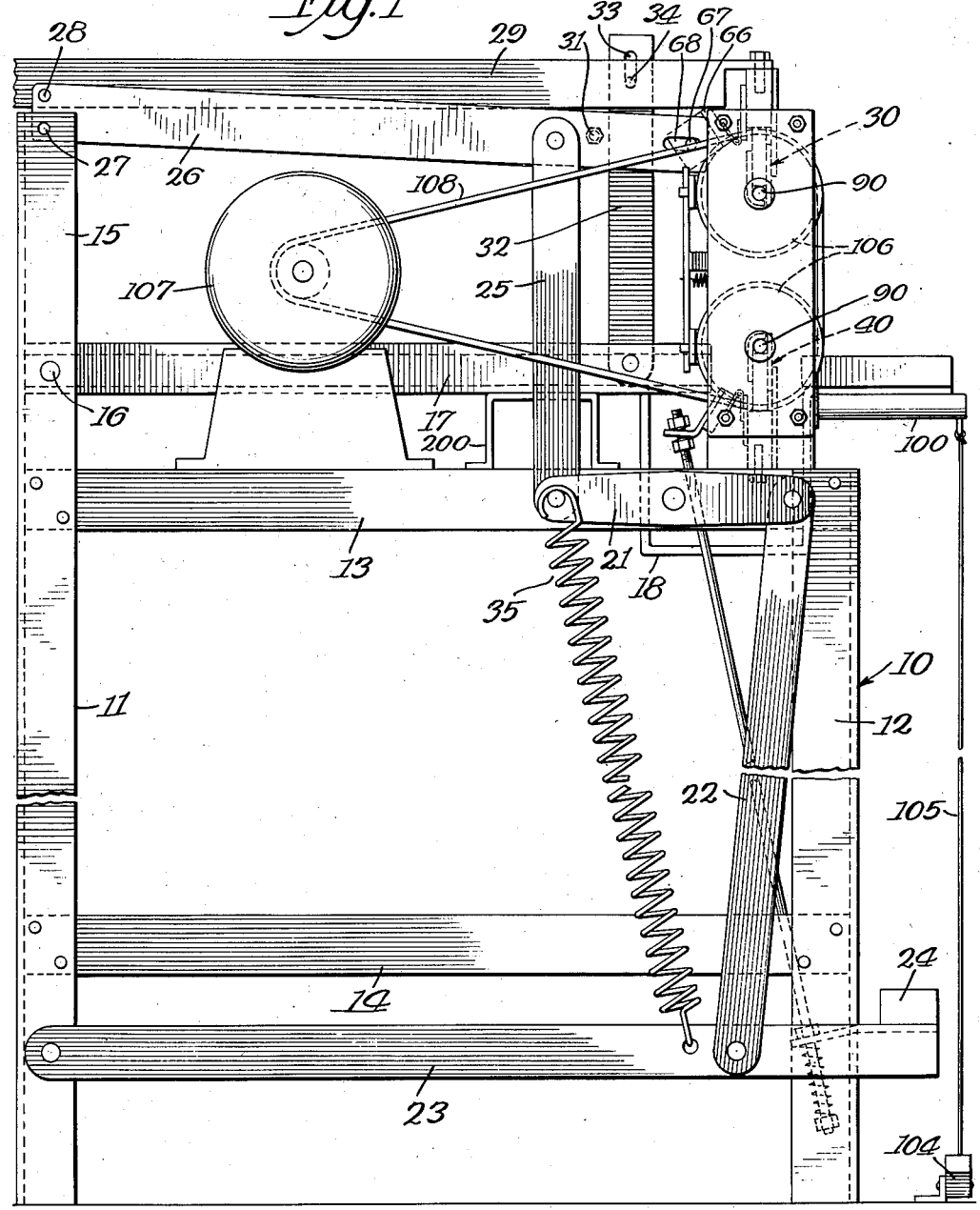
Fig. 1 is a side elevation of the spring assembling machine.

Referring to the drawings, the reference character 10 represents the frame of the machine which comprises the rear standards 11, front standards 12 and the upper and lower cross members 13 and 14 at each side of the frame. The rear standards 11 at each side of the frame extend upwardly beyond the upper cross members 13 to form the extension 15 to which is pivoted operating levers, as will presently appear.

Pivotally attached to the lower portion of the extension 15, as at 16, is a table or platform 17 (see Figs. 1 and 2) for supporting the spring structure. The platform 17 has its forward portion spaced from the main body portion and is secured thereto by any suitable means, such as the U-shaped bracket 18 at each side of the frame, A stop 200 at each side of the frame limits the downward movement of the forward portion of the table 17. The forward portion is in the same plane as the main body portion of the table 17. The machine is employed for assembling spring structures for use in mattresses and the like. Each assembly comprises a plurality of spiral springs 19 (see Fig. 3) arranged in rows with the terminal turns of the springs of adjacent rows connected together by helicals 20.

The mechanism for holding and positioning the lower terminal turns of the spiral springs is located between and below the sections of the table and the mechanism for holding and positioning the upper terminal turns of the spirals is located vertically above the same. The table is movable upwardly for freeing the springs from the lower holding mechanism and means are provided for elevating the upper holding mechanism for freeing the springs therefrom, as will presently appear.

The table 17 is adapted to be raised and lowered by any suitable mechanism. In the form of construction shown, which is by way of example only, the table is raised and lowered by mechanism which will now be described. Pivotally attached to the cross member 13 at each side of the frame is a short lever 21, the forward end of which is pivotally connected to a link 22 which in turn is pivoted to a treadle lever 23. The treadle levers 23 are pivoted at their rear ends to the rear standards 11. The treadle lever 23 extend forwardly of the frame 10 and are connected by the tradle 24, whereby the treadle levers 23 may be depressed by the operator from any position along the front of the machine.

The lever 21 is pivoted at its rear end to a link 25 which is pivotally connected to a control lever 26 which in turn is pivoted at its rear end to the upper end of extension 15, as at 27. The control lever 26 has pivoted at its rear end, as at 28, an elevating arm 29 which extends forwardly adjacent to the control lever 26 to the front of the machine for supporting the upper holding and supporting mechanism. Each of the control levers 26 is provided with a laterally extending stud or lug 31 (see Figs. 1, 2, and 3) which is adapted to engage beneath the elevating arm 29 when the control lever 26 is elevated. A connecting lever 32 is pivotally connected to the platform or table 17 at its lower end and has a slot 33 at its upper end through which extends a pin 34 on the arm 29.

When the treadle 24 is depressed, the control levers 26 are elevated through the links 22 and 25 and the levers 21. The engagement of the studs or lugs 31 with the under sides of the elevating arms 29 will elevate said arms and when the pins 34 on the arms 29 engage the upper ends of the slots 33, the table 17 will be elevated by the links 32. The parts are restored to normal position by a spring 35 at each side of the machine, each of which is attached to the rear end of the lever 21 at its upper end and secured to the treadle lever 23 at its lower end, as clearly shown in Figs. 1 and 2 of the drawings.

Suitable means are provided for holding the adjacent portions of the terminal turns of the two rows of spiral springs and for connecting said portions together by helicals. The means for holding the terminal turns of the spring will first be described.

In the form of construction disclosed, mechanisms 30 and 40 are provided for holding both the upper and lower turns of the springs. These mechanisms are substantial duplicates of each other—one being arranged above, and the other below the springs.

Figure 3:
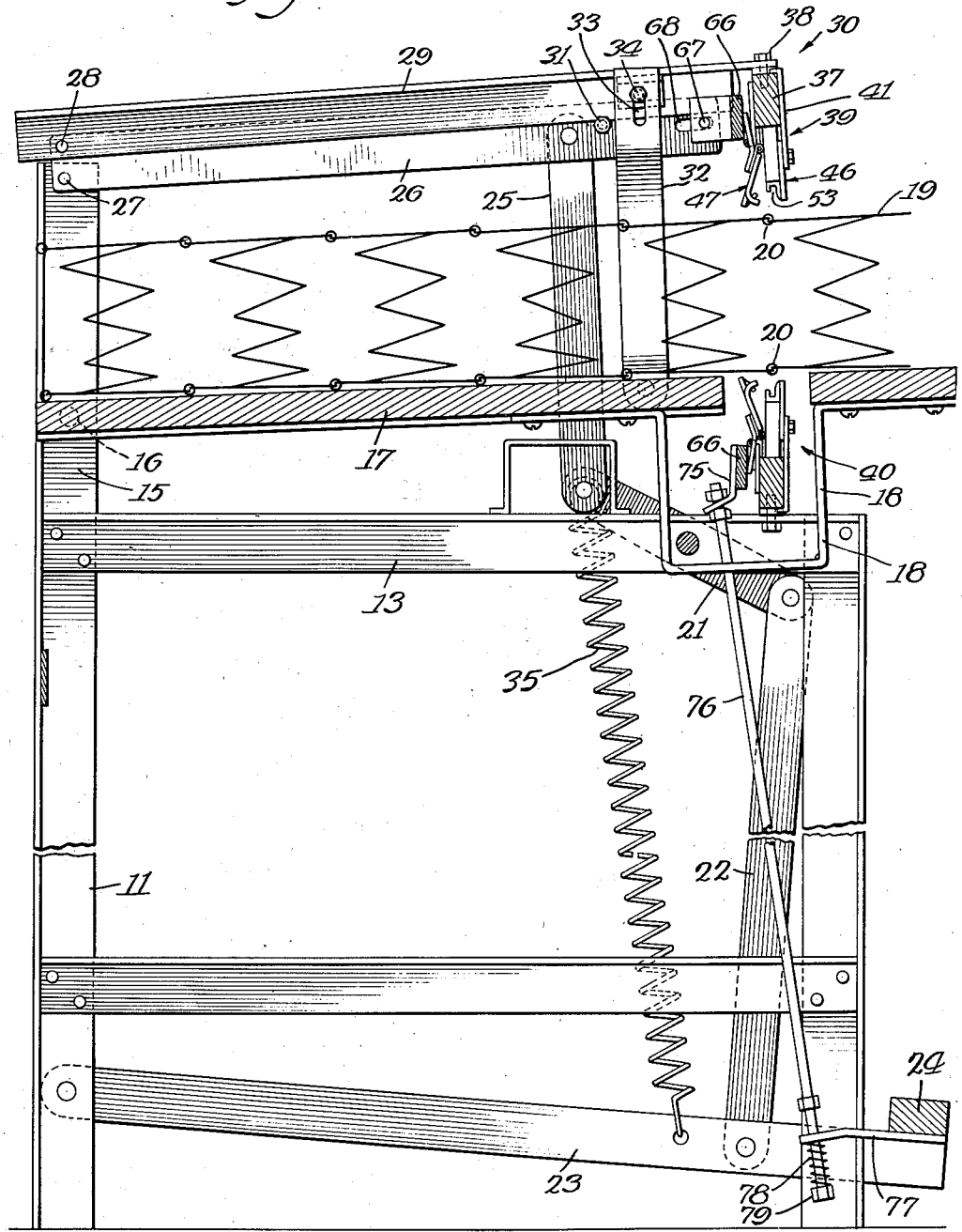
Fig. 3 is a section on the line 3—3 of Fig. 2.

Since the mechanism above the springs is the same as that below, the upper mechanism will be described. As shown in Figs. 3, 6, and 7, the upper mechanism 30 comprises a rack bar 37 which is rigidly connected to the forward end of the elevating arm 29 in any suitable manner.

In the form of construction shown, the arm 29 is in the form of an angle bar, the vertical web of which is removed at its forward end and to the horizontal flange of which the rack bar is rigidly connected, as by means of the screws or bolts 38.

In the construction of spring assemblies, it is desirable that the means provided for holding the springs in position be adjustable so that the spirals may be arranged at different distances apart, constituting different types of assemblies. In the form of construction shown, each of the rack bars 37 is provided with a plurality of jigs 39 adjustably attached thereto. Each of these jigs is provided with a supporting plate 41 (see Figs. 2, 6, and 7), the upper end of which is provided with laterally extending fingers 42 at each side edge of said plate which are adapted to engage between the teeth 43 of a rack formed on the upper edge of a rack bar 37.

Each plate 41 is provided with a slot 44 through which a clamping screw 45 extends. The screw 45 engages a threaded opening in the bar 37. By means of this pin and slot connection, the screw 45 may be unloosened and the plate 41 adjusted on the bar for laterally adjusting the jig along the bar. If desired, a plurality of threaded openings may be provided along the bar 37 for receiving the screws 45, thereby affording additional means for adjusting the jigs along said bar. Each of the jigs 39 comprises a stationary jaw or portion 46 and a movable jaw or portion 47 hinged thereto in any suitable manner, as by means of the hinge members 48.

The stationary portion of each jig comprises a base plate 49 secured beneath the rack bar 37 by the supporting plate 41 and a side plate 51 extending beyond the free edge of the plate 49 to form with the lower edge of the movable portion of the jig 47 a groove 52 for guiding the connecting helical, as will presently appear. The lower edge of the base plate 49 is provided with a plurality of U-shaped projections 53 (see Figs. 4, 5, and 6) each projection comprising a base 54 extending diagonally across the bottom wall of the groove 52 and end members or projections 55 and 56 which extend downwardly from the ends of the base 54 along the inner side walls of the plate 46 and the movable portion of the jig 47, respectively. The projections 53 are arranged diagonally across the groove so that the extensions 55 and 56 engage between the turns of the helical, as will presently appear. The extensions 55 and 56 are separated a sufficient distance to receive a terminal turn of one of the spirals. As shown in Fig. 4, the plate 46 is provided with suitable openings 57 through which the terminal turn of the adjacent helical extends.

The movable portion 47 of the jig comprises the keeper bar 58 (see Figs. 4, 5, and 6) which is hinged at its upper end, as at 48, and has its lower end extending downwardly beyond the lower edge of the base plate 49 to form one side of the groove 52. Each of these keepers is provided with forwardly and downwardly extending fingers 59, one set opposite each of the projections 53. The fingers 59 are preferably, though not necessarily, punched out from the movable portion or jaw of the jig. The length of these fingers is such that they will hold the terminal turns of the spirals against the base 54 between the extensions 55 and 56, as indicated in Figs. 6 and 7 of the drawings. The extensions 56 terminate below the upper ends of the fingers 59, as indicated in Fig. 6 of the drawings.

The keeper bar 58 is provided with a curved extension 61 (see Figs. 5 and 6) having a concave inner surface 62 (see Fig. 5) for forming with the plate 46 and the lower edge of the base plate 49 a guide opening for the helical. The outer end of the opening 62 is cone-shaped, as shown at 63 in Fig. 5, for guiding the helical in the opening 62.

These keeper bars are provided with suitable openings or slots for receiving the terminal turns of the helical. Preferably, the spirals of each row are arranged alternately with right and left wound spirals. In the event the engaging portions of the springs are distorted and the distortion at one side of the spring is different from that at the other, the slots for the terminal turns of the springs will be different.

For instance, in the present construction, each spring is provided with a straight offset portion 60 and at the opposite side with an offset portion having a crimp 70 therein. The stationary and movable jaws are alternately provided with slots 800 for receiving the crimp 70, as clearly shown in Fig. 5 and at the left in Fig. 4.

Suitable means are provided for operating the keeper bars 58. In the form of construction shown, each of these bars is provided with an upwardly and rearwardly extending arm 64 which may be attached to the bar 58 in any suitable manner, as by means of the bolt 65. An operating bar 66 is provided for moving the arm 64 for operating the keeper bar 58. The ends of this bar are bent rearwardly and are provided with studs 67 (see Fig. 3) which engage in slots 68 in the forward ends of the control levers 26. The operating bar 66 is hingedly connected to the rack bar 37 in any suitable manner, as by means of the hinges 69 (see Fig. 6). The operating arms 64 are yieldingly held against the side of the operating bar 66 by a resilient means of any appropriate construction. In the form of construction shown, coil springs 71 are employed for this purpose. One end of the spring is extended, as at 72, and engages an opening 73 in the arm 64 (see Fig. 6) and the other end of the spring is extended, as at 74, and engages the rear side of the bar 66.

By means of this arrangement, the plate 58, or keeper bars, and the holding fingers 59 are resiliently held in operative position by the springs 71 whereby when the parts are moved to operative position, no damage will be done the mechanism should the jaw 58 engage some obstruction to its movement.

The rack bar for the lower jigs is rigidly secured to the frame, as by being connected to the flange of the cross members 13 by suitable bolts (see Fig. 3).

The operating bar 66 for the lower jigs is provided at each end thereof with an operating arm 75 at each end thereof (see Figs. 3 and 7). The lower end of this arm extends downwardly and rearwardly and is provided with an opening through which an operating rod 76 extends. Nuts on the rod engage above and below said arm for operating the arms and the lower end of the rod 76 is connected to the treadle 24, as by means of a bracket 77. This bracket is provided with an opening at its rear end through which the rod extends. The rod extends downwardly beyond the bracket 77 and has a coil spring 78 between said bracket and a nut 79 on the end of the rod. The coil spring cushions the movement of the parts when the treadle is depressed.

The spring 71 (see Fig. 7) prevents undue strain being applied to the movable jaw when the treadle is depressed, as described above.

In the normal operation of the machine, when it is desired to add an additional row of springs to the unfinished assembly, the treadle 24 is depressed, which elevates the table 17 and the upper bar 37, thus releasing the jigs from the spring assembly, as clearly shown in Fig. 3 of the drawings. The assembly may be then pushed rearwardly to bring the forward portions of the terminal turns of the last row of springs in vertical alignment with the jigs. The treadle may now be released, and the springs seated in the jigs. An additional row of springs is then seated in the jigs, the springs being compressed to pass between the upper and lower jigs. In placing the additional springs in position, the inclined surfaces of the fingers 59 will cause the movable jaws to yield and snap over the terminal turns of the spirals, after which said turns are connected together by helicals, as will presently appear.

Suitable means are provided for rotating and advancing the helicals for connecting the spirals together. In the form of construction shown, mechanisms including a plurality of rollers are employed for this purpose. Each of these mechanisms comprises a pair of rollers mounted on journals fixed in the supporting frame mounted on the frame 10 of the machine. The outer ends of the rollers 81 and 82 of the lower mechanism are provided with elongated gear teeth 83 and 84 which are adapted to mesh with a hollow pinion 85 having corresponding elongated teeth. The upper feeding mechanism is similar to the lower, being provided with a pair of rollers 86 and 87 which have elongated teeth and are connected in the same manner as the rollers 81 and 82. The upper feeding mechanism is provided with a third roller 88, and the lower mechanism with a third roller 89. The rollers 88 and 89 are provided with elongated teeth 91 which are adapted to be engaged by the teeth of the pinions 85 for operating the rollers. The rollers 88 and 89 are so mounted that they may be moved to inoperative position by moving the inner ends away from the cooperating rollers.

In the form of construction shown, each of these rollers is mounted on a shaft 92 (see Fig. 9), the outer end of which is bent at right angles and loosely extends through an opening in the frame member 93 rigidly connected to the supporting frame 80. An angular bar 94 engages the outer or bent end of the shaft 92, and the outer end of said shaft extends through an opening in the outer end of said bar (see Fig. 9).

The outer ends of the shafts 92 are connected together by a bar 95 whereby they may be caused to move in unison. The bar 95 is adapted to be moved to and from the rollers 81 and 82 in any suitable manner. As shown, an operating bar 98 connected to the angular bars 94 is employed for this purpose.

A leaf spring 99 is adapted to engage said bar 98 for holding the parts in inoperative position. They are moved to operative position by a lever 100 (see Figs. 1 and 6) which has a bell crank arm 101 to which a spring 102 is attached, as by means of the eye bolt 103.

Figure 2:
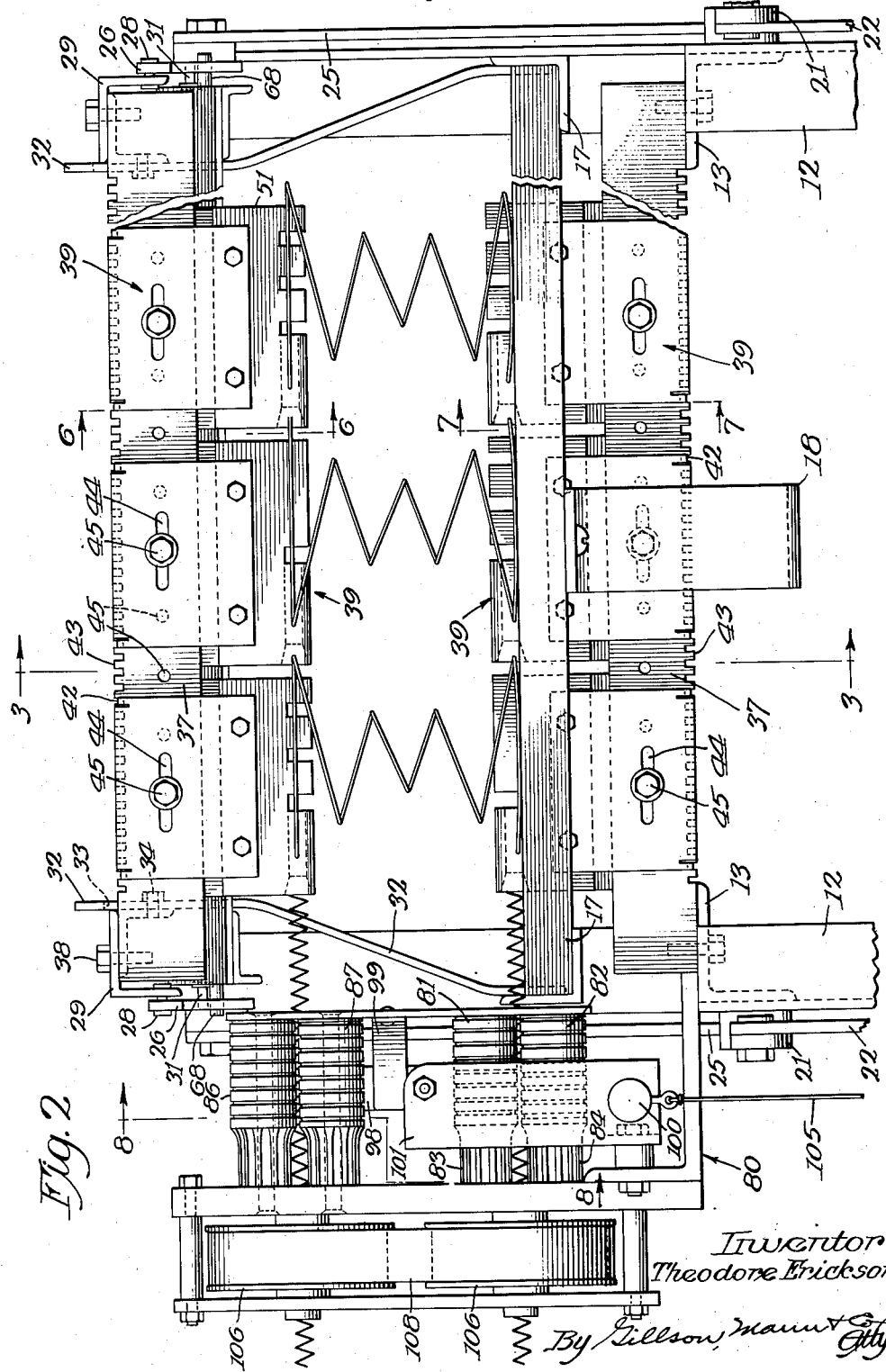
Fig. 2 is a front elevation thereof with parts broken away.

The spring 102 is connected to a central portion of the bar 98 so that when the lever 100 is depressed, the bar 98 will be forced forwardly against the resistance of the spring 99 for moving the rollers 88 and 89 into operative relation with the remaining rollers of the driving mechanism. If desired, the handle 100 may be connected to a suitable foot treadle 104, by cable, or the like 105, as shown in Fig. 1 of the drawings. The pinions 85 have elongated hubs extending outwardly through driving pulleys 106 and are keyed thereto. Both driving mechanisms are operated from the motor 107 through a belt 108 which engages pulleys 106 rigidly connected to the hubs of the pinions 85. The hubs of the pinions 85 are journaled in the frame 93 of the driving mechanism and are adapted to be rotated by the pulleys 106 which in turn continuously operate the rollers of the feeding mechanism. Each of the feeding rollers is provided with projections 109 and depressions 110 which are adapted to engage the turns of the helical for rotating the helical and advancing the same. In the normal operation of the device, the helicals are introduced into the axial openings 90 through the upper and lower pinions 85. The treadle 104 is depressed for depressing the lever arm 100 which, in turn, will bring the rollers 88 and 89 into contact with the helicals, forcing the latter against the remaining rollers for rotating and advancing the same. For stopping the feeding mechanism, it is only necessary to release the treadle 104 whereupon the spring 99 will move the bar 98 and with it the inner end of the rollers rearwardly out of engagement with the helicals. On the other hand, when it is desired to release the jigs, the treadle 24 must be depressed. It will thus be seen that the operator cannot very well operate the machine to advance the helicals while the jigs are in released position, since the two treadles cannot both be depressed at one time, by the operator.

I claim as my invention:

1. In a machine for making spring assemblies, a support, jigs for holding spiral springs in rows, means for supporting said jigs from said support, means for adjusting said first-named means transversely to said support and means for rotating and advancing helicals for connecting adjacent rows of said springs together.

2. In an assembling machine, a support, means movably mounted on said support for holding a plurality of spiral springs in rows, said means including jigs for engaging the terminal turns of said springs, means interlocking with said support for adjusting said jigs longitudinally of said rows and means for connecting said rows together by helicals.

3. In a spring assembling machine, a platform for supporting two rows of springs adjacent to each other, a plurality of upper jigs and a plurality of lower jigs arranged in rows one above the other for holding said springs in assembling position, and means interlocking with said support for supporting and independently adjusting each of said jigs longitudinally of said rows for making spring assemblies of different constructions.

4. A jig for holding the terminal turn of a spiral spring and for guiding a helical about said turn comprising, a stationary portion having slotted projections thereon for receiving said turn, and a movable portion having an inwardly extending finger for holding said turn within the slots of said projections, said movable portion having a curved extension thereon for forming with said stationary portion a guiding channel for said helical.

5. A jag for holding the terminal turn of a spiral spring and for guiding a helical about said turn comprising, a stationary portion having slotted projections thereon for receiving said turn, a movable portion having means thereon for engaging said turn for holding the same within said slotted projections and means carried by said movable portion and concave on its inner surface conforming to the curvature of said helical for forming with said stationary portion a guide passage for said helical.

6. In a spring assembling mechanism, a jig for holding and guiding elements of a spring assembly, said jig comprising a stationary portion having a U-shaped projection thereon for receiving a terminal turn of a spiral spring, a movable section having an inwardly extending finger for engaging said turn for holding the same in position, means for guiding a helical around said turn and a supporting plate having a slot therein for adjustably securing said jig to a supporting member.

7. A jig for a machine for assembling spiral springs in a unitary structure comprising a stationary portion, a movable portion hinged to said stationary portion, an operating arm rigidly secured to said movable portion, cooperating means on said portions for holding a turn of a spiral spring, and means on said portions for forming a guiding passage for a helical, the outer end of said passage flaring outwardly for guiding the end of a connecting helical into said passage.

8. In a spring assembling machine, a pair of bars spaced apart, means for holding said bars in parallel spaced relation one above the other, each of said bars having a rack on its outer edge, a plurality of wire holding and helical guiding jigs, a supporting plate for each jig, finger means on each plate for adjustably engaging said rack bar and means for clamping said plate to said bar at adjusted positions along said bar.

9. In a spring assembling machine, an upper bar, a lower bar spaced vertically from said upper bar and parallel therewith, a plurality of wire holding jigs secured to each bar, means for raising and lowering said upper bar, each of said jigs comprising a stationary jaw and a movable jaw pivotally connected to said stationary jaw, an operating arm rigidly connected to each of said movable jaws, an operating bar pivoted to each of said first named bars, spring means for clamping said arms to said operating bars and means for simultaneously opening said jaws during the elevation of said upper bar.

10. In a spring assembling machine, mechanism for holding spiral springs in rows and means for rotating and advancing a helical for connecting said springs and rows together, said means comprising a pair of rollers rotating in a fixed plane, a third roller opposite the two rollers, a gear for each of said rollers, a hollow pinion in permanent mesh with all of said gears, means for moving the free end of said third roller toward and from the said pair of rollers whereby a helical introduced through said hollow pinion will be rotated when said third roller is moved into proximity to said pair of rollers, means for advancing said helical when the same is rotated and means for rotating said rollers.

11. A feeding mechanism for a spring assembling machine comprising a frame, a pair of rollers journaled in said frame, an axle pivotally mounted on said frame, a third roller rotatably mounted on said axle, the outer ends of said rollers being provided with gears, a pinion permanently in mesh with said gears, said pinion having an axial opening for receiving a helical connecting member, and circumferential projections on said rollers for engaging between the turns of said helical for advancing the same, and means for moving, causing said third roller to press said helical against said pair of rollers.

12. In a spring assembling machine, a shaft having elongated gear teeth on one end, a bearing for said shaft, said shaft having an axial opening of uniform diameter for permitting a helical to be passed therethrough, and a pulley on said shaft for rotating the same and means for feeding a helical through said shaft when the same is rotated.

13. In a spring assembly, a frame having an opening therethrough, a shaft extending through said opening and having the end adjacent said opening bent at right angle to the body of said shaft, a roller journaled on said shaft and an angular bar having its ends secured to the ends of said shaft for holding said shaft in said opening and for retaining said roller on said shaft.

14. In combination, a frame, a table pivoted to said frame and having an opening extending across its forward end portion, a lower bar mounted on said frame beneath said opening, a plurality of spring holding jigs adjustably secured to said bar, a lever at each side of said frame, means for pivotally connecting said levers to said frame, an upper bar secured to said levers, a plurality of wire holding jigs adjustably secured to said upper bar, each of said jigs comprising a stationary jaw and a movable jaw, an operating arm rigidly secured to each of said movable jaws and extending outwardly therefrom, operating bars pivotally connected to said upper and lower bars, operating levers pivoted to said frame and having pin and slot connections with said operating bars, means for resiliently clamping said operating arms and operating bars together, pins on said operating levers for engaging beneath said first named levers for elevating the same when said operating levers are elevated, links pivoted to said table and having pin and slot connections with said first named levers, a lever pivoted at its intermediate portion to each side of said frame, link connections between the rear ends of said last named levers and said operating levers, and means including a treadle for raising and lowering the forward ends of said levers, and a spring for holding said treadle elevated whereby upon initial downward movement of said treadle said jigs will be released and upon further depression said table and upper bar and jigs attached thereto will be elevated.

15. In a spring assembling machine, means for supporting two rows of spiral springs adjacent to each other, mechanism for rotating and advancing a helical for connecting said springs together, said mechanism comprising a plurality of rolls for engaging the peripheral surface of said helical for rotating the same, means engaging the turns of said helical for advancing the helical, a tubular member for guiding said helical into contact with said rolls, means for rotating said member, and means for rotating said rolls from said member.

16. In a spring assembling machine, a supporting frame, a bearing mounted on said frame, a shaft journaled in said bearing, means for rotating said shaft and means for feeding a helical through said shaft when the same is rotated.

THEODORE ERICKSON.